(12) United States Patent
Chen

(10) Patent No.: US 12,145,862 B2
(45) Date of Patent: Nov. 19, 2024

(54) WATER CLEANER

(71) Applicant: NingBo Poolstar Pool Products Co.,Ltd, Zhejiang (CN)

(72) Inventor: Liang Chen, Zhejiang (CN)

(73) Assignee: NingBo Poolstar Pool Products Co., Ltd, Ningbo (CN)

( * ) Notice: Subject to any disclaimer, the term of this patent is extended or adjusted under 35 U.S.C. 154(b) by 603 days.

(21) Appl. No.: 17/400,601

(22) Filed: Aug. 12, 2021

(65) Prior Publication Data
US 2022/0033278 A1 Feb. 3, 2022

(51) Int. Cl.
C02F 1/00 (2023.01)
E04H 4/16 (2006.01)
C02F 103/42 (2006.01)

(52) U.S. Cl.
CPC ............ C02F 1/001 (2013.01); E04H 4/16 (2013.01); *C02F 2103/42* (2013.01); *C02F 2201/004* (2013.01); *C02F 2201/007* (2013.01)

(58) Field of Classification Search
CPC ............. C02F 1/001; C02F 2103/42; C02F 2201/004; C02F 2201/007; C02F 2201/006; E04H 4/16; B01D 29/21; B01D 29/23; B01D 29/58; B01D 35/26
See application file for complete search history.

(56) References Cited

U.S. PATENT DOCUMENTS

| | | | | |
|---|---|---|---|---|
| 4,962,559 A | * | 10/1990 | Schuman | E04H 4/1618 15/350 |
| 6,962,655 B1 | * | 11/2005 | Gjerstad | B01D 29/23 210/416.2 |
| 7,060,182 B2 | * | 6/2006 | Erlich | E04H 4/1636 210/167.16 |
| 9,903,133 B2 | | 2/2018 | Bruneel | |
| 10,030,403 B2 | | 7/2018 | Bruneel | |
| 2016/0326761 A1 | * | 11/2016 | Bruneel | B01D 29/117 |
| 2020/0353390 A1 | * | 11/2020 | Roumagnac | B01D 39/08 |

FOREIGN PATENT DOCUMENTS

| | | | | |
|---|---|---|---|---|
| CN | 210768005 U | * | 6/2020 | ............ B01D 29/52 |
| CN | 212141644 U | | 12/2020 | |
| CN | 112370847 A | * | 2/2021 | ............ B01D 29/03 |
| CN | 212491757 U | | 2/2021 | |

OTHER PUBLICATIONS

Lu, CN112370847 A, English machine translation (Year: 2021).*
Cen, CN210768005 U, English machine translation (Year: 2020).*

* cited by examiner

*Primary Examiner* — Chester T Barry

(57) ABSTRACT

A water cleaner, including a housing, a filtering mechanism and a filtering unit. Two ends of the housing are respectively provided with an inlet and an outlet. The filtering mechanism is arranged in the housing. The sewage flows into the housing through the inlet and flows towards the filtering mechanism. The filtering mechanism is configured to filter the sewage to obtain clean water, which flows out of the housing through the outlet. The filtering unit is arranged at the inlet of the housing, and is configured to allow water remaining in the housing to be discharged and prevent dirt remaining in the housing from being discharged when the water cleaner stops sewage purification and is separated from the sewage.

9 Claims, 2 Drawing Sheets

WATER CLEANER

CROSS-REFERENCE TO RELATED APPLICATIONS

This application claims the benefit of priority from Chinese Patent Application No. 202020670454.0, filed on Apr. 28, 2020. The content of the aforementioned application, including any intervening amendments thereto, is incorporated herein by reference in its entirety.

TECHNICAL FIELD

This application relates to water cleaning devices, and more particularly to a water cleaner.

BACKGROUND

As for a water cleaner, a baffle is usually arranged at an inlet of a housing to close the inlet, so as to prevent residual dirt in the housing from being discharged through the inlet and polluting the external environment when the water cleaner stops the sewage purification and is removed from the sewage. However, the baffle often completely seals the inlet in use, so that the water remaining in the housing cannot be smoothly discharged from the housing after use, rendering the water cleaner heavy and not convenient to transfer.

SUMMARY

Therefore, it is necessary to provide a water cleaner, where the water remaining in the housing can be simply removed, and the dirt in the housing can be blocked from being discharged through the inlet.

The technical solutions of the present disclosure are described as follows.

A water cleaner, comprising:
a housing;
a filtering mechanism; and
a filtering unit;
wherein one end of the housing is provided with a first inlet, and the other end of the housing is provided with a first outlet;
the filtering mechanism is arranged in the housing; the first inlet is configured to allow sewage to be treated to flow into the housing and flow towards the filtering mechanism; the filtering mechanism is configured to filter the sewage to be treated to obtain clean water; the first outlet is configured to allow the clean water to flow out of the housing; and
the filtering unit is arranged at the first inlet of the housing; and the filtering unit is configured to allow water remaining in the housing to be discharged to outside of the housing and prevent dirt remaining in the housing from being discharged to the outside of the housing through the first inlet when the water cleaner stops sewage purification and is separated from the sewage to be treated.

In some embodiments, an end of the housing away from the first outlet is bent inward and extends to form a diversion tube; an opening of an end of the diversion tube close to the first outlet constitutes the first inlet; and the filtering unit is arranged at an end of the diversion tube close to the first outlet.

In some embodiments, the filtering unit comprises:
a baffle; and
a filtering screen;
wherein the baffle is arranged at the end of the diversion tube close to the first outlet; and the baffle is configured to open or close the first inlet; and
the filtering screen is arranged on the baffle; and the filtering screen is configured to allow the water remaining in the housing to be discharged to the outside of the housing and prevent dirt remaining in the housing from being discharged to the outside of the housing through the first inlet when the baffle blocks the first inlet to stop the sewage purification of the water cleaner and the water cleaner is separated from the sewage to be treated.

In some embodiments, the baffle is rotatably arranged at the end of the diversion tube close to the first outlet to open or close the first inlet.

In some embodiments, a cavity is formed between the diversion tube and an inner side wall of the housing; and the cavity is configured to accommodate large and heavy dirt in the sewage to be treated.

In some embodiments, a first end and/or an outer circumference of the filtering mechanism is provided with a second inlet; a second end of the filtering mechanism is provided with a second outlet; the clean water obtained through filtration of the filtering mechanism flows into the filtering mechanism through the second inlet, and then passes through the second outlet and the first outlet to flow out of the housing; the first end of the filtering mechanism is an end of the filtering mechanism close to the first inlet; and the second end of the filtering mechanism is an end of the filtering mechanism close to the first outlet.

In some embodiments, the filtering mechanism comprises:
a support cylinder; and
a filter cartridge;
wherein a first end and/or an outer circumference of the support cylinder is provided with the second inlet; a second end of the support cylinder is provided with the second outlet; the filter cartridge surrounds an area of the support cylinder provided with the second inlet; the sewage to be treated is capable of flowing towards the filter cartridge and being filtered through the filter cartridge to obtain the clean water; the second inlet is configured to allow the clean water to flow into the support cylinder; the first end of the support cylinder is an end of the support cylinder close to the first inlet; and the second end of the support cylinder is an end of the support cylinder close to the first outlet.

In some embodiments, the first end of the support cylinder and the outer circumference of the support cylinder are both provided with the second inlet; the filter cartridge is arranged around the outer circumference of the support cylinder; the filtering mechanism further comprises a sealing cover; and the second inlet at the first end of the support cylinder is sealed through the sealing cover to prevent the sewage to be treated from flowing into the support cylinder through the second inlet at the first end of the support cylinder.

In some embodiments, the water cleaner further comprises:
an impeller assembly;
wherein the impeller assembly is arranged in the housing, and is arranged between the support cylinder and the first outlet; the impeller assembly is configured to suck the sewage to be treated such that the sewage to be treated enters the housing through the first inlet and flows towards the filter cartridge; and the impeller assembly is also configured to suck the clean water in the support cylinder to allow the clean water to flow out of the support cylinder through the second outlet.

In some embodiments, the impeller assembly comprises:
a driving part; and
an impeller;
wherein the driving part is arranged in the housing; the driving part is provided with a rotating shaft; the impeller is arranged on the rotating shaft; and the driving part is configured to drive the impeller to rotate with respect to an axial direction of the rotating shaft through the rotating shaft, such that the impeller generates a centrifugal force for sucking the sewage to be treated and the clean water.

The beneficial effects of the present disclosure are described as follows.

When the water cleaner of the disclosure is in use, the sewage to be treated can flow into a housing through an inlet and flow towards a filtering mechanism, and is filtered through the filter mechanism to obtain clean water. The clean water then flows out of the housing through an outlet. Therefore, the sewage is purified by the water cleaner. A filtering unit is arranged at the inlet of the housing. The filtering unit is configured to allow the water remaining in the housing to be discharged to the outside of the housing, so as to reduce the weight of the water cleaner after being used to help users to transfer the water cleaner. In addition, the filtering unit is also configured to prevent the dirt remaining in the housing from being discharged to the outside of the housing through the inlet when the water cleaner stops the sewage purification, so as to prevent the discharged dirt from polluting the external environment or returning to the sewage to be treated and causing secondary pollution of the sewage.

BRIEF DESCRIPTION OF THE DRAWINGS

Technical solutions of the prior arts and the present disclosure will be described more clearly below with reference to the accompanying drawings. Obviously, the accompanying drawings are part of the embodiments of this disclosure, and other accompanying drawings can be made by those skilled in the art without sparing creative works.

DETAILED DESCRIPTION OF EMBODIMENTS

Technical solutions of the present disclosure will be further described below with reference to the accompanying drawings. The accompanying drawings provided herein are preferred embodiments to allow this disclosure to be better understood, and not intended to limit the present disclosure.

It should be noted that when an element A is referred to as being "fixed on" an element B, the element A can be directly fixed on the element B or fixed on the element B through another element. When an element A is considered to be "connected" to an element B, the element A can be directly connected to the element B or connected to the element B through another element. The terms such as "vertical", "horizontal", "left" and "right" used herein are illustrative, and not intended to limit the present disclosure.

Unless otherwise specified, all technical and scientific terms used herein have the same meaning as commonly understood by those skilled in the art. The terms used here are illustrative, and not intended to limit the present disclosure. The term "and/or" used herein includes one of those elements or a combination of those elements.

Figure 1:
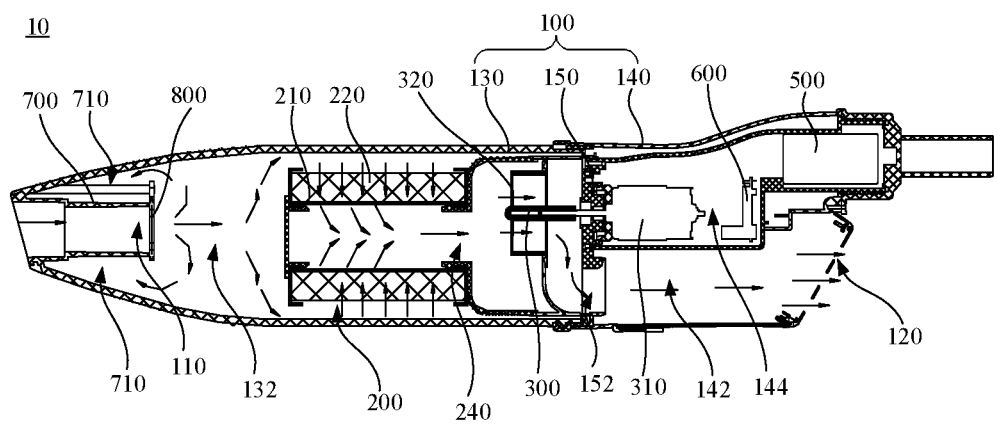
FIG. 1 is a cross-sectional view of a water cleaner in accordance with an embodiment of the present disclosure.
Figure 2:
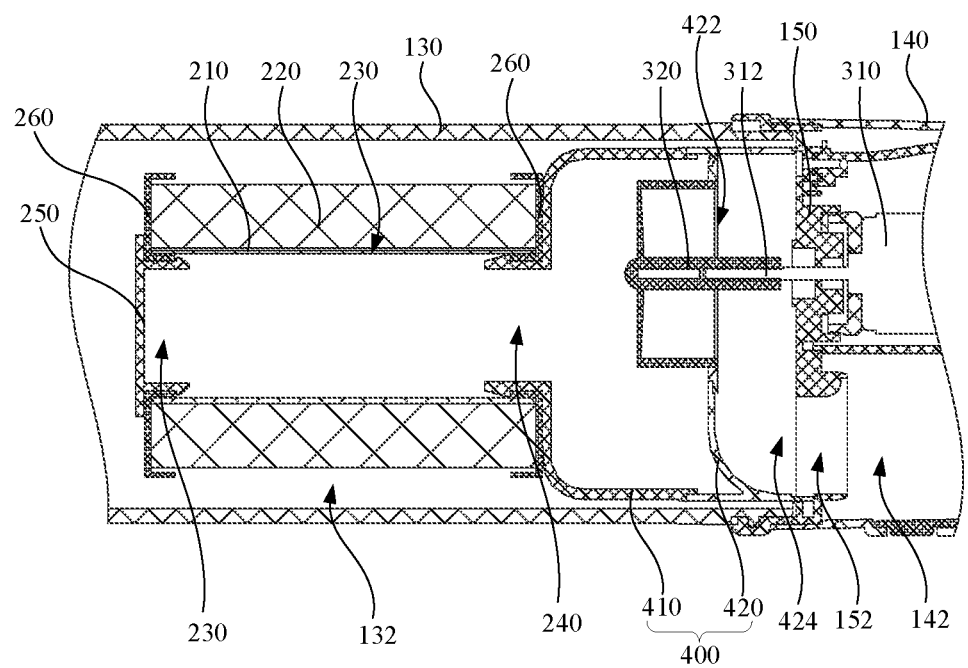
FIG. 2 is a partial cross-sectional view of the water cleaner in accordance with an embodiment of the present disclosure.

As shown in FIGS. 1-2, a water cleaner 10 is provided, which is configured to purify water in a pool. The water cleaner 10 includes a housing 100 and a filtering mechanism 200. Two ends of the housing 100 are provided with a first inlet 110 and a first outlet 120, respectively. The filtering mechanism 200 is arranged in the housing 100. Sewage to be treated can flow into the housing 100 through the first inlet 110 and flow towards the filtering mechanism 200. The sewage is filtered through the filtering mechanism 200 to obtain clean water, and the clean water flows out of the housing 100 through the first outlet 120, such that the sewage is purified by the water cleaner 10.

In an embodiment, a first end and/or outer circumference of the filtering mechanism 200 is provided with a second inlet 230, and a second end of the filtering mechanism 200 is provided with a second outlet 240. Sewage to be treated can flow into the housing 100 through the first inlet 110 and flow towards the filtering mechanism 200. The sewage is filtered through the filtering mechanism 200 to obtain clean water. The clean water flows into the filtering mechanism 200 through the second inlet 230, and subsequently passes through the second outlet 240 and the first outlet 120 to flow out of the housing 100. The first end of the filtering mechanism 200 is an end of the filtering mechanism 200 close to the first inlet 110, and the second end of the filtering mechanism 200 is an end of the filtering mechanism 200 close to the first outlet 120.

The filtering mechanism 200 can hold up dirt in the sewage to an outside of the filtering mechanism 200, such that the filtering mechanism 200 can make full use of the space in the housing 100 to store the dirt in the sewage, effectively improving the dirt-holding capacity of the filtering mechanism 200. Therefore, the filtering mechanism 200 can effectively filter the sewage, enhancing the purification performance and efficiency of the water cleaner 10.

In an embodiment, the filtering mechanism 200 includes a support cylinder 210 and a filter cartridge 220. A first end and/or outer circumference of the support cylinder 210 is provided with a second inlet 230, and a second end of the support cylinder 210 is provided with a second outlet 240. The filter cartridge 220 surrounds an area of the support cylinder 210 provided with the second inlet 230. The sewage to be treated can flow towards the filter cartridge 220, and be filtered through the filter cartridge 220 to obtain clean water. The clean water flows into the support cylinder 210 through the second inlet 230. The first end of the support cylinder 210 is an end of the support cylinder 210 close to the first inlet 110, and the second end of the support cylinder 210 is an end of the support cylinder 210 close to the first outlet 120.

It should be understood that in some embodiments, the support cylinder 210 may be arranged outside the filter cartridge 220 to support the filter cartridge 220; and in some embodiments, when the strength of filter cartridge 220 is large enough, the support cylinder 210 is not necessary.

As shown in FIG. 2, in this embodiment, the first end and the outer circumference of the support cylinder 210 are both provided with the second inlet 230. The filter cartridge 220 surrounds the outer circumference of the support cylinder 210. The filtering mechanism 200 further includes a sealing cover 250. The second inlet 230 at the first end of the support cylinder 210 is sealed through the sealing cover 250. Specifically, the sealing cover 250 is clamped in the second inlet 230 at the first end of the support cylinder 210, so as to prevent unfiltered sewage from flowing into the support cylinder 210 through the second inlet 230 at the first end of the support cylinder 210 and directly flowing out of the housing 100 through the second outlet 240 at the second end of the support cylinder 210 and the first outlet 120. Therefore, the purification quality of the water cleaner to the sewage is ensured. It should be understood that in other embodiments, when the first end of the support cylinder 210 is a closed end, the sealing cover 250 may be omitted.

In some embodiments, when both the first end and the outer circumference of the support cylinder 210 are provided with the second inlet 230, the first end and the outer circumference of the support cylinder 210 are both provided with the filter cartridge 220, such that on the premise that the water entering into the support cylinder 210 is fully filtered, the support cylinder 210 can discharge water through a plurality of parts of the support cylinder 210, improving the purification performance and efficiency of the water cleaner 10. Specifically, in an embodiment, the second inlet 230 on the outer circumference of the support cylinder 210 includes a plurality of sub-inlet holes, and the plurality of sub-inlet holes are spaced apart on the outer circumference of the support cylinder 210.

As shown in FIG. 2, in an embodiment, the filtering mechanism 200 further includes an end cover 260. The end cover 260 is provided at the first end and/or the second end of the support cylinder 210. The filter cartridge 220 is fixed on the support cylinder 210 through the end cover 260. In this embodiment, the first end of the support cylinder 210 and the second end of the support cylinder 210 are both provided with the end cover 260 to improve the fixing stability of the filter cartridge 220 with respect to the support cylinder 210. Specifically, the end cover 260 is clamped in the second inlet 230 at the first end of support cylinder 210 and the second outlet 240 at the second end of the support cylinder 210.

It should be noted that in this embodiment, the filter cartridge 220 may be, but is not limited to, a filter paper. It should be understood that in other embodiments, the filter cartridge 220 may be a layer of cotton filter or made of other materials that can retain dirt.

In an embodiment, an outer wall of the filter cartridge 220 is folded to form wrinkles, so as to effectively increase a contact area between the filter cartridge 220 and the sewage to improve the filtering effect of the filter cartridge 220 on the sewage.

Figure 3:
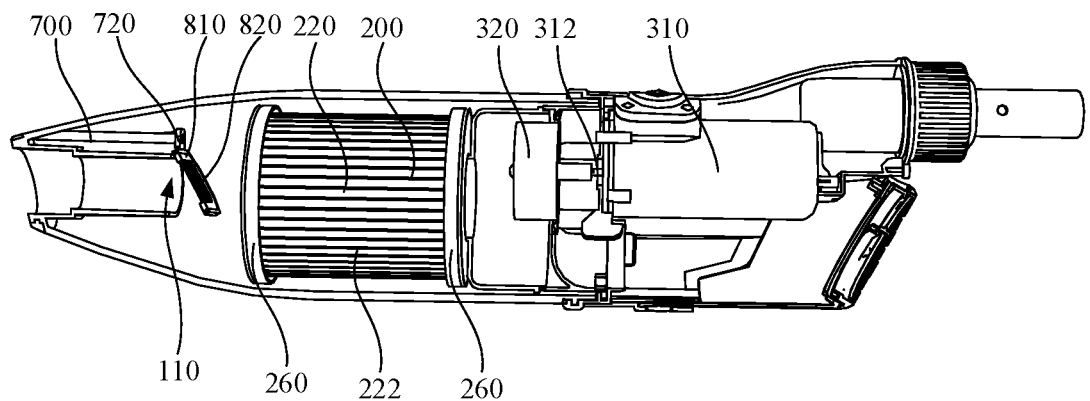
FIG. 3 schematically depicts a partial structure of the water cleaner in accordance with an embodiment of the present disclosure.

As shown in FIG. 3, in an embodiment, the outer wall of the filter cartridge 220 is folded to form a plurality of strip-shaped protrusions 222 arranged side by side to increase the contact area between the filter cartridge 220 and the sewage. Specifically, the plurality of strip-shaped protrusions 222 extend along an axial direction of the support cylinder 210.

As shown in FIG. 1, in an embodiment, the water cleaner 10 further includes an impeller assembly 300. The impeller assembly 300 is arranged in the housing 100, and is arranged between the support cylinder 210 and the first outlet 120. The impeller assembly 300 is configured to suck the sewage to allow the sewage to enter the housing 100 through the first inlet 110 and flow towards the filter cartridge 220, and suck the clean water in the support cylinder 210 to allow the clean water to flow out of the support cylinder 210 through the second outlet 240.

As shown in FIGS. 1 and 2, the impeller assembly 300 includes a driving part 310 and an impeller 320. The driving part 310 may be but not limited to a motor. The driving part 310 is arranged in the housing 100. The driving part 310 is provided with a rotating shaft 312. The impeller 320 is arranged on the rotating shaft 312. The driving part 310 is configured to drive the impeller 320 to rotate with respect to an axial direction of the rotating shaft 312 through the rotating shaft 312, such that the impeller 320 generates a centrifugal force for sucking the sewage and the clean water.

In an embodiment, the housing 100 includes a first housing 130, a second housing 140 and an auxiliary component 150. The first housing 130 is provided with a first accommodating cavity 132, and the second housing 140 is provided with a second accommodating cavity 142. The first housing 130 is connected to the second housing 140 through the auxiliary component 150, and the auxiliary component 150 separates the first accommodating cavity 132 and the second accommodating cavity 142. An end of the first housing 130 away from the second housing 140 is provided with the first inlet 110, and an end of the second housing 140 away from the first housing 130 is provided with the first outlet 120. A main body of the driving part 310 is arranged on a side of the auxiliary component 150 facing the second accommodating cavity 142. The rotating shaft 312 of the driving part 310 passes through the auxiliary component 150 and protrudes into the first accommodating cavity 132. The impeller 320 is arranged in the first accommodating cavity 132. The auxiliary component 150 is provided with a through hole 152 communicating the first accommodating cavity 132 with the second accommodating cavity 142. When the driving part 310 drives the impeller 320 to rotate and perform a suck, the sewage to be treated can flow into the first accommodating cavity 132 through the first inlet 110 and flow towards the filter cartridge 220. The clean water obtained after the sewage is filtered by the filter cartridge 220 flows into the second accommodating cavity 142 through the second outlet 240, a gap of the impeller 320 and the through hole 152 in sequence, and finally flows out through the first outlet 120.

Specifically, when the driving part 310 drives the impeller 320 to rotate and perform a suck, the sewage to be treated will flow into the first accommodating cavity 132 through the first inlet 110 under a centrifugal force of the impeller 320 and flow towards the filter cartridge 220. When the sewage is sucked into the first accommodating cavity 132, large and heavy dirt (such as sand and fallen leaves) in the sewage will be trapped in the first accommodating cavity 132 in advance. At the same time, the remaining water in the sewage and the small and light dirt (such as dust) will flow to the filter cartridge 220 together. At this time, the small and light dirt in the sewage will be further intercepted by the filter cartridge 220. The clean water obtained after filtering by the filter cartridge 220 will flow into the support cylinder 210 through the second inlet 230 on the outer circumference of the support cylinder 210, flow into the second accommodating cavity 142 through the second outlet 240, a gap of the impeller 320 and the through hole 152 in sequence, and finally flow out through the first outlet 120. Thus, the water cleaner 10 achieves the sewage purification.

As shown in FIG. 2, in an embodiment, the water cleaner 10 further includes a water-blocking assembly 400. The water-blocking assembly 400 is arranged in the first accommodating cavity 132, and encloses the impeller 320 and the rotating shaft 312. The water-blocking assembly 400 is configured to block a flow of unfiltered sewage in the first accommodating cavity 132 towards the impeller 320, preventing the unfiltered sewage from directly flowing into the second accommodating cavity 142 through the gap of the impeller 320 and the through hole 152 and flowing out through the first outlet 120. Therefore, the purification quality of the water cleaner to the sewage is ensured.

As shown in FIG. 2, in an embodiment, the water-blocking assembly 400 includes a first water-blocking part 410 and a second water-blocking part 420. The first water-blocking part 410 is connected to the second water-blocking part 420. An end of the first water-blocking part 410 away from the second first water-blocking part 420 is connected to the second end of the support cylinder 210. Specifically, in this embodiment, the end of the first water-blocking part 410 away from the second water-blocking part 420 is clamped in the second outlet 240 at the second end of the support cylinder 210, and the first water-blocking part 410 surrounds the impeller 320.

An end of the second water-blocking part 420 connected to the first water-blocking part 410 is provided with a first water-receiving port 422. The first water-receiving port 422 is communicated with the gap of the impeller 320. An end of the second water-blocking part 420 away from the first water-blocking part 410 is provided with a second water-receiving port 424, and the second water-receiving port 424 is communicated with the through hole 152. The second water-blocking part 420 is configured to guide transmission of the clear water between the gap of the impeller 320 and the through hole 152.

As shown in FIG. 1, in an embodiment, the water cleaner 10 further includes a power source 500, and the power source is arranged in the housing 100 and is electrically connected to the driving part 310. The power source 500 is configured to supply power to the driving part 310. In an embodiment, the water cleaner 10 further includes a controller 600, which is arranged in the housing 100 and is electrically connected to the driving part 310. The controller 600 is configured to control switch-on and switch-off of the driving part 310.

In this embodiment, the power source 500 can be, but is not limited to, a battery. The power source 500 and the controller 600 are arranged in the second accommodating cavity 142. Furthermore, an electric-control cavity 144 is arranged isolatedly in the second accommodating cavity 142. A main body of the driving part 310, the power source 500 and the controller 600 are arranged in the electric-control cavity 144, so as to avoid a short circuit caused by that the clean water flowing into the second containing cavity 142 directly contacts the above-mentioned electrical components.

As shown in FIGS. 1 and 3, in an embodiment, an end of the housing 100 away from the first outlet 120 is bent inward to form a diversion tube 700. An opening of an end of the diversion tube 700 close to the first outlet 120 constitutes the first inlet 110. Specifically, the diversion tube 700 is arranged in an end of the first housing 130 away from the second housing 140.

As shown in FIG. 1, in an embodiment, an auxiliary cavity 710 is formed between the diversion tube 700 and an inner side wall of the housing 100. The auxiliary cavity 710 is configured to accommodate large and heavy dirt in the sewage. Specifically, in this embodiment, the auxiliary cavity 710 is formed between the diversion tube 700 and the inner side wall of the first housing 130. The auxiliary cavity 710 is formed in the first accommodating cavity 132, and the auxiliary cavity 710 is arranged on both sides of the inner wall of the draft tube 700.

As shown in FIGS. 1 and 3, in an embodiment, the water cleaner 10 further includes a filtering unit 800. The filtering unit 800 is arranged at the first inlet 110 of the housing 100, and the filtering unit 800 is configured to allow the water remaining in the housing 100 to be discharged to outside of the housing 100 and prevent the dirt remaining in the housing 100 from being discharged to the outside of the housing 100 through the first inlet 110 when the water cleaner 10 stops the sewage purification and is separated from the sewage.

The filtering unit 800 is arranged at the first inlet 110 of the housing 100, and the filtering unit 800 is configured to allow the water remaining in the housing 100 to be discharged to outside of the housing 100 when the water cleaner 10 stops the sewage purification and is separated from the sewage, so as to reduce the weight of the water cleaner 10 after being used and help users to transfer the water cleaner 10. In addition, the filtering unit 800 is also configured to prevent the dirt remaining in the housing 100 from being discharged to the outside of the housing 100 through the first inlet 110 when the water cleaner 10 stops the sewage purification, so as to prevent the discharged dirt from polluting the external environment or returning to the sewage to be treated and causing secondary pollution of the sewage.

As shown in FIG. 1 and FIG. 3, the filtering unit 800 is arranged at an end of the diversion tube 700 close to the first outlet 120.

Figure 4:
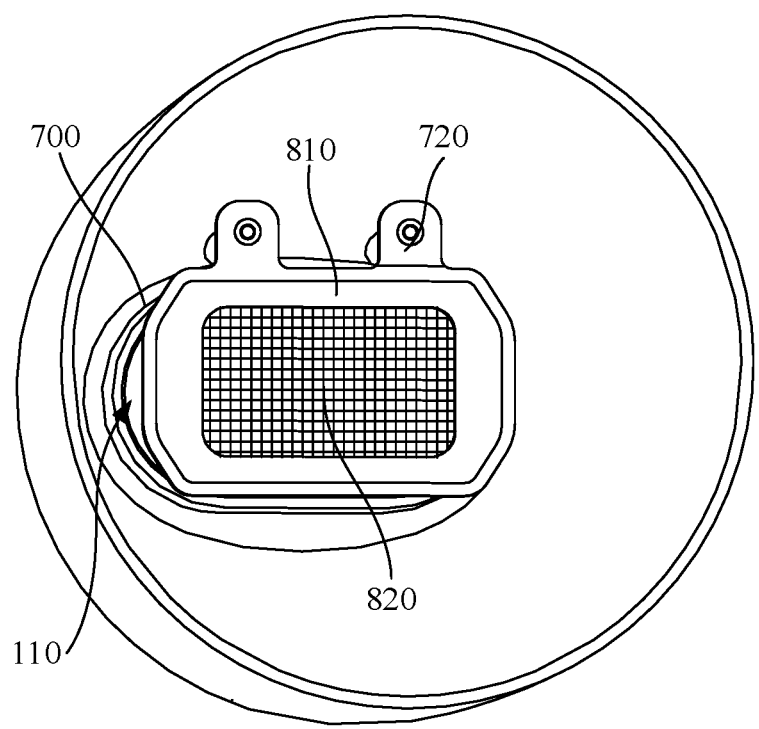
FIG. 4 schematically depicts another partial structure of the water cleaner in accordance with an embodiment of the present disclosure.

As shown in FIGS. 3 and 4, the filtering unit 800 includes a baffle 810 and a filtering screen 820. The baffle 810 is arranged at the end of the diversion tube 700 close to the first outlet 120. The baffle 810 is configured to open or close the first inlet 110. The filtering screen 820 is arranged on the baffle 810, and the filtering screen 820 is configured to block the first inlet 110 at the baffle 810 to stop the sewage purification by the water cleaner 10. Moreover, when the water cleaner 10 is separated from the sewage, the filtering screen 820 can discharge the water remaining in the housing 100 to the outside of the housing 100 and can prevent the dirt remaining in the housing 100 from being discharged to the outside of the housing 100 through the first inlet 110.

The body cleaner 10 allows the water remaining in the housing 100 to be discharged to the outside of the housing 100 when the sewage is removed, and at the same time prevents the dirt remaining in the housing 100 from being discharged to the outside of the housing 100 through the first inlet 110.

Specifically, when the water cleaner 10 is used to purify sewage, the first inlet 110 is opened through the baffle 810, such that the sewage flows into inside of the housing 100 through the first inlet 110, and then purified by the filtering mechanism 200. When it is required to stop the sewage purification and transfer the water cleaner 10 from the sewage, the first inlet 110 is closed through the baffle 810. At this time, there is no sewage outside the water cleaner 10 that can flow into the housing 100 through the first inlet 110, and the water remaining in the housing 100 can be discharged to the housing 100 through the filtering screening 820 on the baffle 810, effectively reducing the weight of the water cleaner 10 after being used and facilitating the user to transfer the water cleaner 10. The filtering screening 820 can prevent the dirt remaining in the housing 100 from being discharged to the outside of the housing 100 through the first inlet 110 after the use of the water cleaner 10, so as to prevent the discharged dirt from polluting the external environment or returning to the sewage to be treated and causing secondary pollution of the sewage.

As shown in FIG. 3 and FIG. 4, the baffle 810 is rotatably arranged at the end of the diversion tube 700 close to the first outlet 120 to open or close the first inlet 110.

Specifically, when the water cleaner 10 is out of service and no sewage flows towards the inside of the housing 100 through the first inlet 110, the baffle 810 abuts against the end of the diversion tube 700 close to the first outlet 120 under gravity to block the first inlet 110, such that the first inlet 110 is closed by the baffle 810. When the water cleaner 10 is in use and the sewage flows towards the inside of the housing 100, the sewage can overcome the gravity of the baffle 810 and open the baffle 810, so as to open the first inlet 110 through the baffle 810.

As shown in FIGS. 3 and 4, a stiffening rib 720 is arranged on an upper side of the end of the diversion tube 700 close to the first outlet 120. The baffle 810 is rotatably arranged on the stiffening rib 720, such that the baffle 810 is rotatably connected to the end of the diversion tube 700 close to the first outlet 120. In some embodiments, a connecting shaft is arranged on the upper side of the end of the diversion tube 700 close to the first outlet 120, and the baffle 810 is rotatably connected to the end of the diversion tube 700 close to the first outlet 120 through connecting to the connecting shaft. Specifically, the connecting shaft is arranged on the stiffening rib 720.

In some embodiments, the baffle 810 is elastic. A first side of the baffle 810 is fixed on the upper side of the end of the diversion tube 700 close to the first outlet 120, and a second side of the baffle 810 is configured to abut against or separate from a lower side of the end of the diversion tube 700 close to the first outlet 120 to open or close the first inlet 110.

Specifically, when the water cleaner 10 is out of service and no sewage flows towards the inside of the housing 100 through the first inlet 110, the second side of the baffle 810 abuts against the end of the diversion tube 700 close to the first outlet 120 under an elastic force to block the first inlet 110, such that the first inlet 110 is closed by the baffle 810. When the water cleaner 10 is in use and the sewage flows towards the inside of the housing 100, the sewage can overcome the elastic force of the baffle 810 and open the baffle 810, such that the second side of the baffle 810 is separated from the lower side of the end of the diversion tube 700 close to the first outlet 120, so as to open the first inlet 110 through the baffle 810.

In some embodiments, when the stiffening rib 720 is arranged on the upper side of the end of the diversion tube 700 close to the first outlet 120, the first side of the baffle 810 is fixed on the stiffening rib 720, such that the first side of the baffle 810 is fixedly connected to the upper side of the end of the diversion tube 700 close to the first outlet 120.

It should be noted that in this embodiment, when the driving part 310 is running and the sewage flows towards the inside of the housing 100 through the first inlet 110, the driving part 310 can drive the impeller 320 to rotate with respect to the axial direction of the rotating shaft 312, such that the impeller 320 generates an centrifugal force and the centrifugal force of the impeller 320 helps the sewage overcome the elastic force or gravity of the baffle 810 to open the baffle 810, so as to quickly open the first inlet 110 through the baffle 810.

The technical features of the above embodiments can be combined, and rational combinations of the technical features should fall within the scope of this description.

The embodiments mentioned above are merely illustrative, and not intended to limit the scope of this disclosure. It should be noted that modifications and improvements made by those skilled in the art without departing from the spirit of the disclosure should fall within the scope of the present disclosure defined by the appended claims.

What is claimed is:

1. A water cleaner, comprising:
   a housing;
   a filtering mechanism; and
   a filtering unit;
   wherein one end of the housing is provided with a first inlet, and the other end of the housing is provided with a first outlet;
   the filtering mechanism is arranged in the housing; the first inlet is configured to allow sewage to be treated to flow into the housing and flow towards the filtering mechanism; the filtering mechanism is configured to filter the sewage to be treated to obtain clean water; the first outlet is configured to allow the clean water to flow out of the housing; and
   the filtering unit is arranged at the first inlet of the housing; and the filtering unit is configured to allow water remaining in the housing to be discharged to outside of the housing; and
   wherein the end of the housing provided with the first inlet is bent inward and extends to form a diversion tube; the diversion tube comprises a first end away from the first outlet and a second end close to the first outlet; an opening of the second end of the diversion tube constitutes the first inlet; the filtering unit comprises a baffle and a filtering screen; the baffle is arranged at the second end of the diversion tube for opening or closing the first inlet.

2. The water cleaner of claim 1, wherein the filtering unit comprises:
   the filtering screen is arranged on the baffle; and the filtering screen is configured to allow the water remaining in the housing to be discharged to the outside of the housing.

3. The water cleaner of claim 2, wherein the baffle is rotatably arranged at the second end of the diversion tube to open or close the first inlet.

4. The water cleaner of claim 1, wherein a cavity is formed between the diversion tube and an inner side wall of the housing; and the cavity is configured to accommodate dirt in the sewage to be treated.

5. The water cleaner of claim 1, wherein a first end and/or an outer circumference of the filtering mechanism is provided with a second inlet; a second end of the filtering mechanism is provided with a second outlet; the clean water obtained through filtration of the filtering mechanism passes through the second outlet and the first outlet to flow out of the housing.

6. The water cleaner of claim 5, wherein the filtering mechanism comprises:
   a support cylinder; and
   a filter cartridge;
   wherein a first end and/or an outer circumference of the support cylinder is provided with the second inlet; a second end of the support cylinder is provided with the second outlet; the filter cartridge surrounds an area of the support cylinder provided with the second inlet; the sewage to be treated is capable of flowing towards the filter cartridge and being filtered through the filter cartridge to obtain the clean water; the second inlet is configured to allow the clean water to flow into the support cylinder.

7. The water cleaner of claim 6, wherein the first end of the support cylinder and the outer circumference of the support cylinder are both provided with the second inlet; the filter cartridge is arranged around the outer circumference of the support cylinder; the filtering mechanism further comprises a sealing cover; and the second inlet at the first end of the support cylinder is sealed through the sealing cover to prevent the sewage to be treated from flowing into the support cylinder through the second inlet at the first end of the support cylinder.

8. The water cleaner of claim 6, further comprising:
an impeller assembly;
wherein the impeller assembly is arranged in the housing, and is arranged between the support cylinder and the first outlet; the impeller assembly is configured to suck the sewage to be treated such that the sewage to be treated enters the housing through the first inlet and flows towards the filter cartridge; and the impeller assembly is also configured to suck the clean water in the support cylinder to allow the clean water to flow out of the support cylinder through the second outlet.

9. The water cleaner of claim 8, wherein the impeller assembly comprises:
a driving part; and
an impeller;
wherein the driving part is arranged in the housing; the driving part is provided with a rotating shaft; the impeller is arranged on the rotating shaft; and the driving part is configured to drive the impeller to rotate with respect to an axial direction of the rotating shaft through the rotating shaft, such that the impeller generates a centrifugal force for sucking the sewage to be treated and the clean water.

* * * * *